(12) United States Patent
Porro

(10) Patent No.: US 10,700,545 B2
(45) Date of Patent: Jun. 30, 2020

(54) MULTIMEDIA DEVICE

(71) Applicant: LEADING TECHNOLOGIES S.r.L., Monza (Monza Brianza) (IT)

(72) Inventor: Marco Porro, Monza (IT)

(73) Assignee: LEADING TECHNOLOGIES S.R.L., Monza (Monza Brianza) (IT)

( * ) Notice: Subject to any disclaimer, the term of this patent is extended or adjusted under 35 U.S.C. 154(b) by 0 days.

(21) Appl. No.: 16/530,388

(22) Filed: Aug. 2, 2019

(65) Prior Publication Data

US 2019/0252907 A1 Aug. 15, 2019

(30) Foreign Application Priority Data

Aug. 9, 2018 (EP) ..................... 18188190

(51) Int. Cl.
*G03B 21/14* (2006.01)
*H02J 7/14* (2006.01)
*B60L 50/51* (2019.01)

(52) U.S. Cl.
CPC ............. *H02J 7/14* (2013.01); *B60L 50/51* (2019.02)

(58) Field of Classification Search
CPC ....... G09F 9/3026; G03B 21/56; G03B 21/60; H02J 7/14; B60L 50/51
USPC ....................................... 359/449
See application file for complete search history.

(56) References Cited

U.S. PATENT DOCUMENTS

| | | | |
|---|---|---|---|
| 2007/0139626 A1* | 6/2007 | Saleh | G03B 37/04 353/94 |
| 2012/0186119 A1 | 7/2012 | Pitcher et al. | |
| 2015/0312520 A1* | 10/2015 | Nohria | G09B 5/06 434/350 |
| 2016/0210103 A1 | 7/2016 | Yoshizumi et al. | |

FOREIGN PATENT DOCUMENTS

| | | |
|---|---|---|
| CN | 201199412 Y | 2/2009 |
| KR | 10-1202807 B1 | 11/2012 |

OTHER PUBLICATIONS

European Search Report, European Patent Application 18188190, dated Jan. 28, 2019.

* cited by examiner

*Primary Examiner* — William C. Dowling
(74) *Attorney, Agent, or Firm* — Vorys, Sater, Seymour and Pease LLP

(57) ABSTRACT

A multimedia device including a main structure defining a supporting surface extending along a main direction and curved along a single direction oblique with respect to the main direction to form a curved profile, a plurality of secondary structures each defining a fastening surface and suitable to be fastened to the structure in a reciprocally continuous manner along the main direction and the curved profile to entirely cover the supporting surface and form a broken profile approximating to the curved profile, and a plurality of modules including a screen each configured to project images, wherein each of the secondary structures includes a support formed as a single piece and a plurality of modules arranged adjacent to one another along the main direction on the support.

10 Claims, 5 Drawing Sheets

MULTIMEDIA DEVICE

FIELD OF THE INVENTION

The present invention relates to a multimedia device of the type comprising a main structure defining a supporting surface extending along a main direction and curved along a single direction that is oblique with respect to the main direction so as to form a curved profile, a plurality of secondary structures suitable to be fastened to the main structure in a reciprocally continuous manner along the main direction and the curved profile in such a way as to entirely cover the supporting surface, and a plurality of modules comprising a screen each suitable to project images, each of the secondary structures comprising a support formed as a single piece and a plurality of modules arranged adjacent to one another along the main direction on the support, the supporting surface comprising a plurality of arcs defining the curved profile and being at least oblique with respect to the main direction, the device further comprising main fastening means suitable to mechanically fasten each of the secondary structures to at least one of the arcs.

DESCRIPTION OF THE PRIOR ART

In particular, the object of the present invention is a multimedia device for projecting images on a curved and non-conventional surface.

As is known, a plurality of screens are currently available on the market.

Said screens can be used in devices of the type for use in the home, the dimensions of which are compatible with a user of the product being close to said product. Alternatively, said screens can be used for large-scale projections as is the case, for example, in conventional cinemas or at stadiums or the screens used for advertising inside shopping malls or installed on buildings in built-up areas.

Said screens substantially define flat surfaces comprising one or more LED modules designed to be operationally connected, via cables, to a power supply system. Usually, each module has its own power supply and is installed separately from the other modules. Furthermore, the modules are generally designed to be coupled, as already mentioned, in accordance with plane geometry. It is for that reason that the support structures are grids or bars comprising individual housings for the electronic modules.

The prior art described above has some notable drawbacks.

In particular, it is hardly possible to implement curved screens. While large curved screens, used for advertising purposes, do exist, such devices require a large amount of material and are costly in economic terms.

Moreover, when a curved structure has to be produced, installing the modular screens currently available on the market involves difficulties that are not negligible owing to the need to connect each single module.

Such problems are exacerbated when the screens are arranged on portions of a ceiling. In these cases, assembly is also problematic due to the lack of space in which to work, and because it is difficult to access the rear of the modules which are held up by the supporting structures.

In addition, the modules must be continuously calibrated in order to create a screen without any breaks or areas of shadow that would spoil the image being projected.

SUMMARY OF THE INVENTION

In this context, the technical task underlying the present invention is to devise a multimedia device capable of substantially obviating at least some of the above-mentioned drawbacks.

Within the sphere of said technical purpose one important aim of the invention is to obtain a multimedia device that enables curved screens for projecting advertising or other images to be implemented easily.

Another important aim of the invention is to provide a multimedia device that enables the modules comprised within the screen to be installed easily.

In conclusion, a further aim of the invention is to obtain a device that enables curved screens to be implemented without any breaks in or areas of shadow on said screen. The technical purpose and specified aims are achieved with a multimedia device of the type comprising a main structure defining a supporting surface extending along a main direction and curved along a single direction that is oblique with respect to the main direction so as to form a curved profile, a plurality of secondary structures suitable to be fastened to the main structure in a reciprocally continuous manner along the main direction and the curved profile in such a way as to entirely cover the supporting surface, and a plurality of modules comprising a screen each suitable to project images, each of the secondary structures comprising a support formed as a single piece and a plurality of modules arranged adjacent to one another along the main direction on the support, the supporting surface comprising a plurality of arcs defining the curved profile and being at least oblique with respect to the main direction, the device further comprising main fastening means suitable to mechanically fasten each of the secondary structures to at least one of the arcs, each of the supports is substantially a sheet extending along the main direction, when fastened to the main structure, and including each of the modules aligned along the main direction, the fastening means are suitable to fasten the support to the surface of the arc.

BRIEF DESCRIPTION OF THE DRAWINGS

The features and advantages of the invention will be apparent from the following detailed description of preferred embodiments thereof, with reference to the accompanying drawings, in which.

Figure 1:
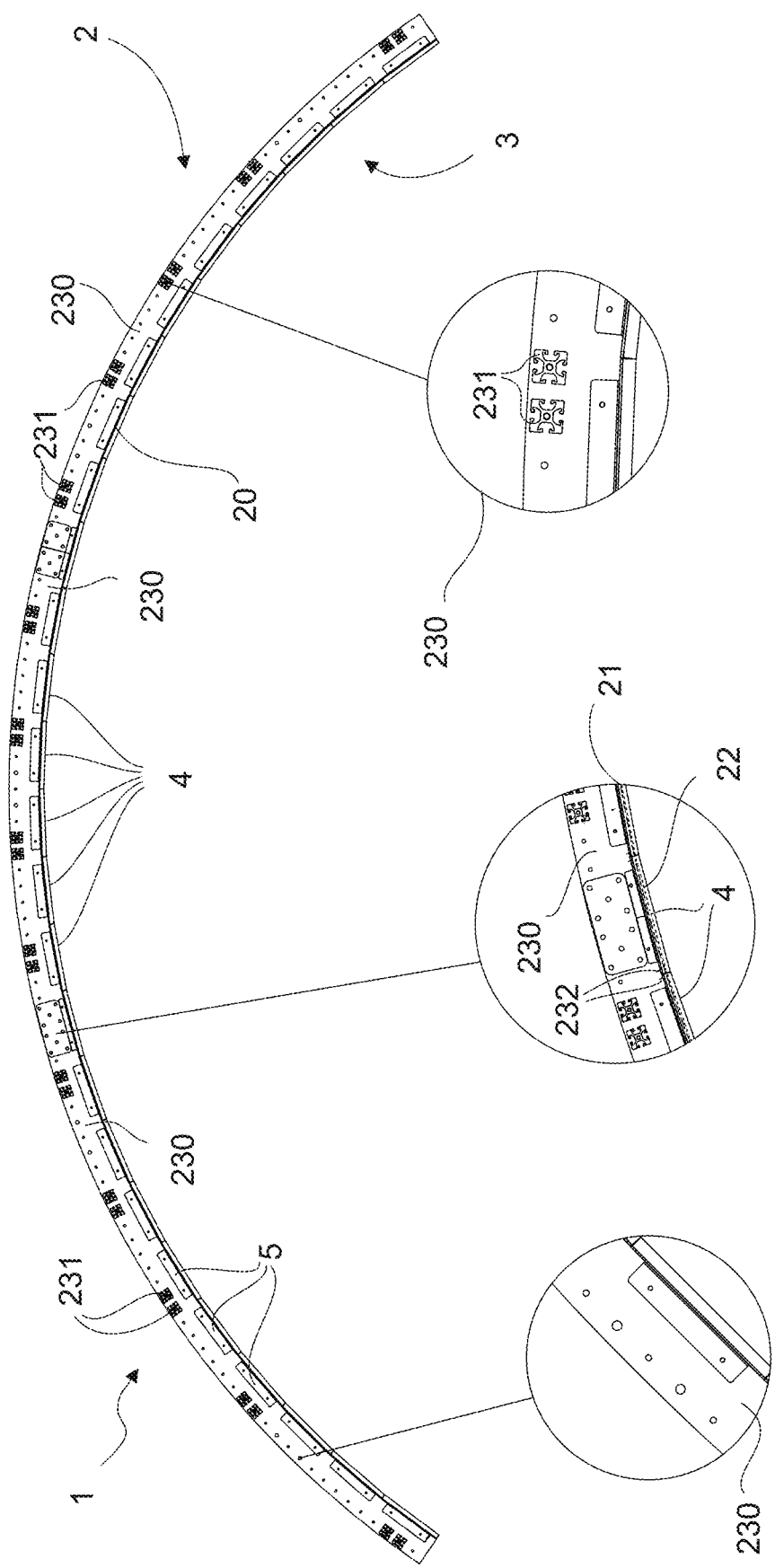
FIG. 1 is a front view of a multimedia device according to the invention.

Herein, the measures, values, shapes and geometric references (such as perpendicularity and parallelism), when used with words like "about" or other similar terms such as "approximately" or "substantially", are to be understood as except for measurement errors or inaccuracies due to production and/or manufacturing errors and, above all, except for a slight divergence from the value, measure, shape or geometric reference which it is associated with. For example, these terms, if associated with a value, preferably indicate a divergence of not more than 10% from said value.

Furthermore, when used, terms such as "first", "second", "higher", "lower", "main" and "secondary" do not necessarily identify an order, a priority relationship or a relative position, but can simply be used to distinguish more clearly the different components from each other.

Unless otherwise indicated, the measurements and data provided in this document are to be considered using International Standard Atmosphere ICAO (ISO 2533:1975).

With reference to the Figures, reference numeral 1 globally denotes the multimedia device according to the invention.

The device 1 is preferably suitable to implement an arched ceiling for the projection of images. Said images may be of various kinds and are preferably digital images. The device 1 preferably comprises a main structure 2 and a plurality of secondary structures 3.

The main structure 2 is preferably suitable to form the arch. It may be fixed to a building structure such as arches, a ceiling, or to side walls, or it may be implemented underneath an existing masonry arch.

Preferably, the main structure 2 defines a supporting surface 20.

The supporting surface 20 is a virtual geometric element defined by portions of the main structure 2. The supporting surface 20 is substantially the surface that defines the arch. Preferably, the supporting surface 20 extends along a main direction 2a; the main direction 2a is thus the predominant direction of extension of the structure 2.

Furthermore, the supporting surface 2a is curved along a single direction that is oblique with respect to the main direction 2a. Preferably, in detail, the supporting surface 2a is curved along a direction that is perpendicular to the main direction 2a. The curved supporting surface 20 thus forms a curved profile 21.

The curved profile 21 thus preferably describes the arc of the arch and defines a surface that, when simply oblique with respect to the main direction 2a enables the formation of oblique arches, or when perpendicular to the main direction 2a enables the formation of substantially straight arches.

From a structural perspective, the main structure 2 defines a frame 23.

The frame 23 preferably envelops the supporting surface 20. Therefore, the frame 23 is preferably a sort of skeleton arranged around the supporting surface 20 so as to form the latter.

The frame 23 thus defines a plurality of arcs 230 and a plurality of joining elements 231.

Each arc 230 substantially defines the curved profile 21. Moreover, they are arranged obliquely with respect to the main direction 2a. In a configuration with a straight arch, preferably, the arcs 230 are arranged in a plane perpendicular to the main direction 2a.

The arcs 230 may be formed as a single piece or be made up of a plurality of secondary arcs joined to one another by means of conventional methods such as mechanical joints or welding or other methods.

The joining elements 231 are, instead, preferably rod structures parallel to the main direction 2a. The joining elements 231 are thus suitable to connect adjacent arcs 230 to one another so that the main structure 2 is a load-bearing structure for a user. Substantially, the arcs 230 are arranged along the main direction 2a and, preferably, reciprocally equally spaced apart and reciprocally structurally connected by the joining elements 231.

A frame 23 of this type can be made of various materials such as wood or metal material, for example aluminium or preferably steel in order to increase the strength of said main structure 2.

The secondary structures 3 are preferably suitable to be fastened to the main structure 2. Said secondary structures 3 preferably have a regular shape so as to form continuous surfaces when arranged side by side.

Figure 2:
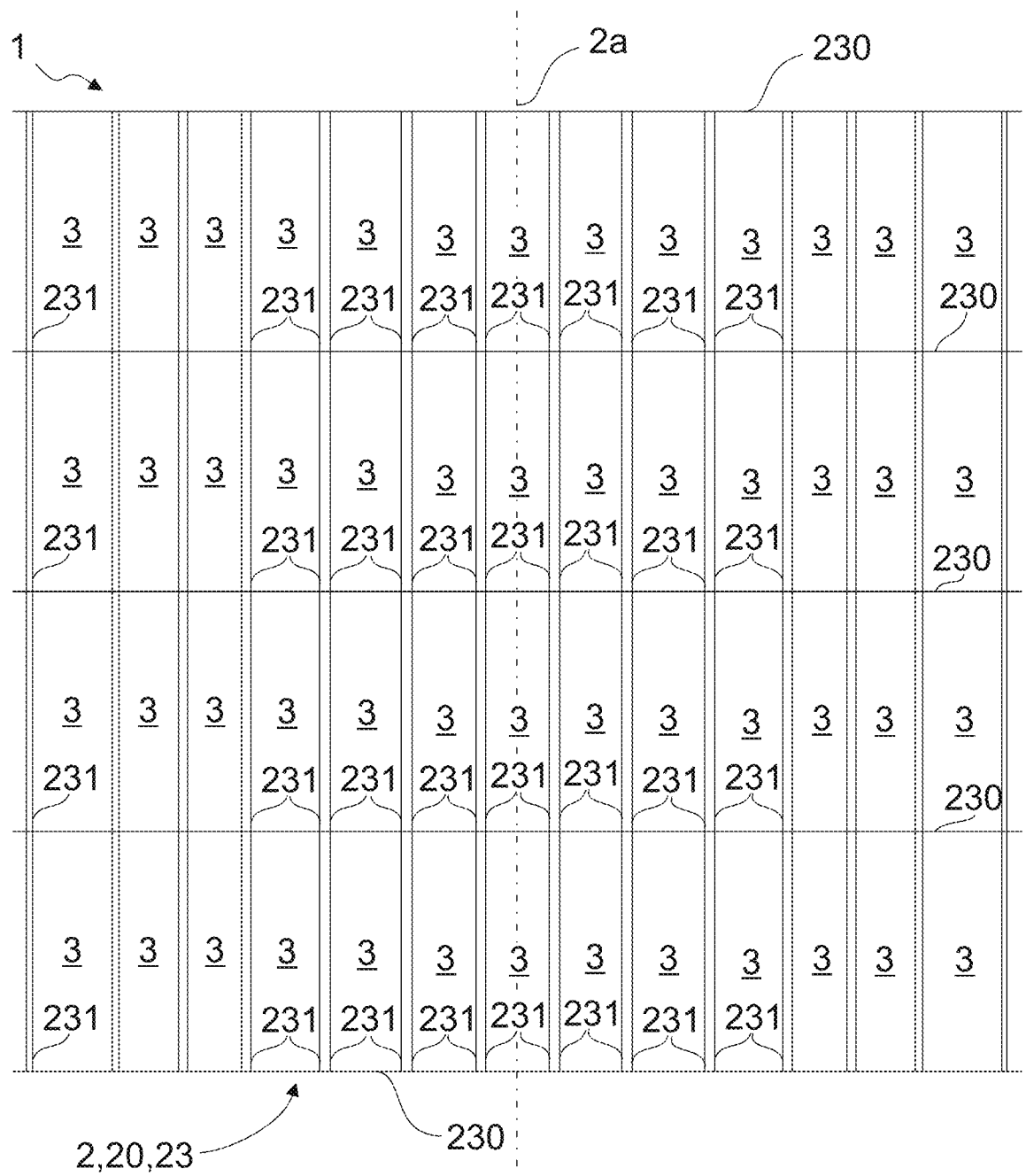
FIG. 2 is a schematic view from above of a multimedia device according to the invention.
Figure 3:
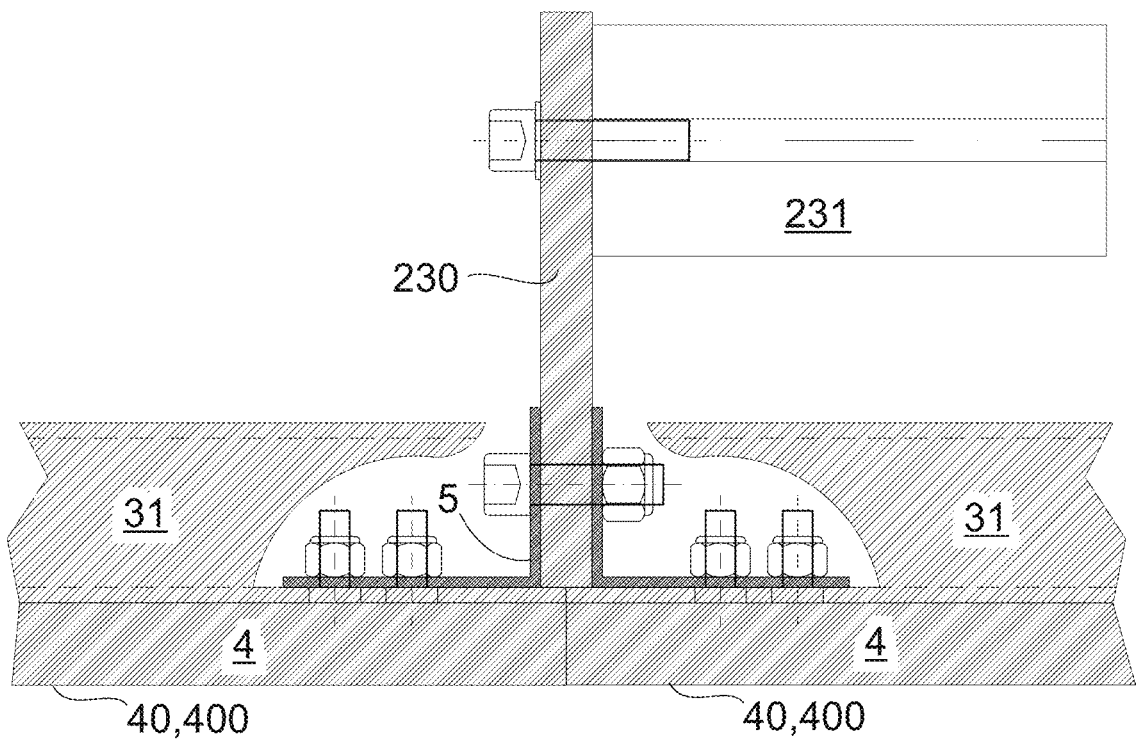
FIG. 3 is a cross-sectional side view of the assembly portion of two secondary structures at an arc of a multimedia device according to the invention.

The secondary structures 3 are suitable to be fastened to the main structure 2 in a reciprocally continuous manner along the main direction 2a and along the curved profile 21, as schematically illustrated in FIG. 2.

In this way, in particular, the secondary structures 3 cover the entire supporting surface 20. Furthermore, the secondary structures 3 are preferably, but not necessarily, flat; therefore, when fastened to the main structure 2 along the curved profile 21 so as to cover the supporting surface 20, they form a broken profile 22. The broken profile 22 is simply a profile consisting of a broken line, that is a series of adjacent segments, that approximate to the curved profile 21.

The secondary structures 3 are thus preferably fastened between two arcs 230. In that respect, preferably, the distance between adjacent arcs 230 is less than the maximum extension along the main direction 2a of the secondary structures 3. This ensures that, along the main direction 2a, the secondary structures 3 extend continuously without leaving any gaps or areas of shadow.

In order to fasten the secondary structures 3 to the arcs 230, the arcs 230 preferably comprise guideways 232.

The guideways 232 are substantially radial notches provided in the arcs 230 so as to enable the controlled interlocking of the secondary structures 3 in pre-defined positions.

Figure 4:
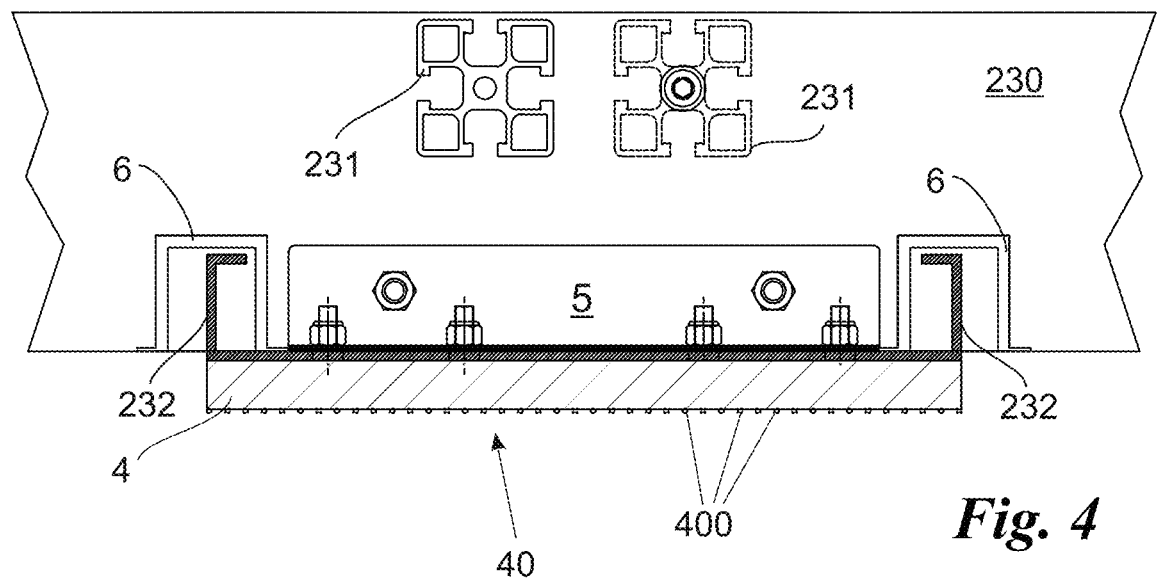
FIG. 4 is a cross-sectional front view of the assembly portion of two secondary structures at an arc of a multimedia device according to the invention in which the separators are also shown.
Figure 5:
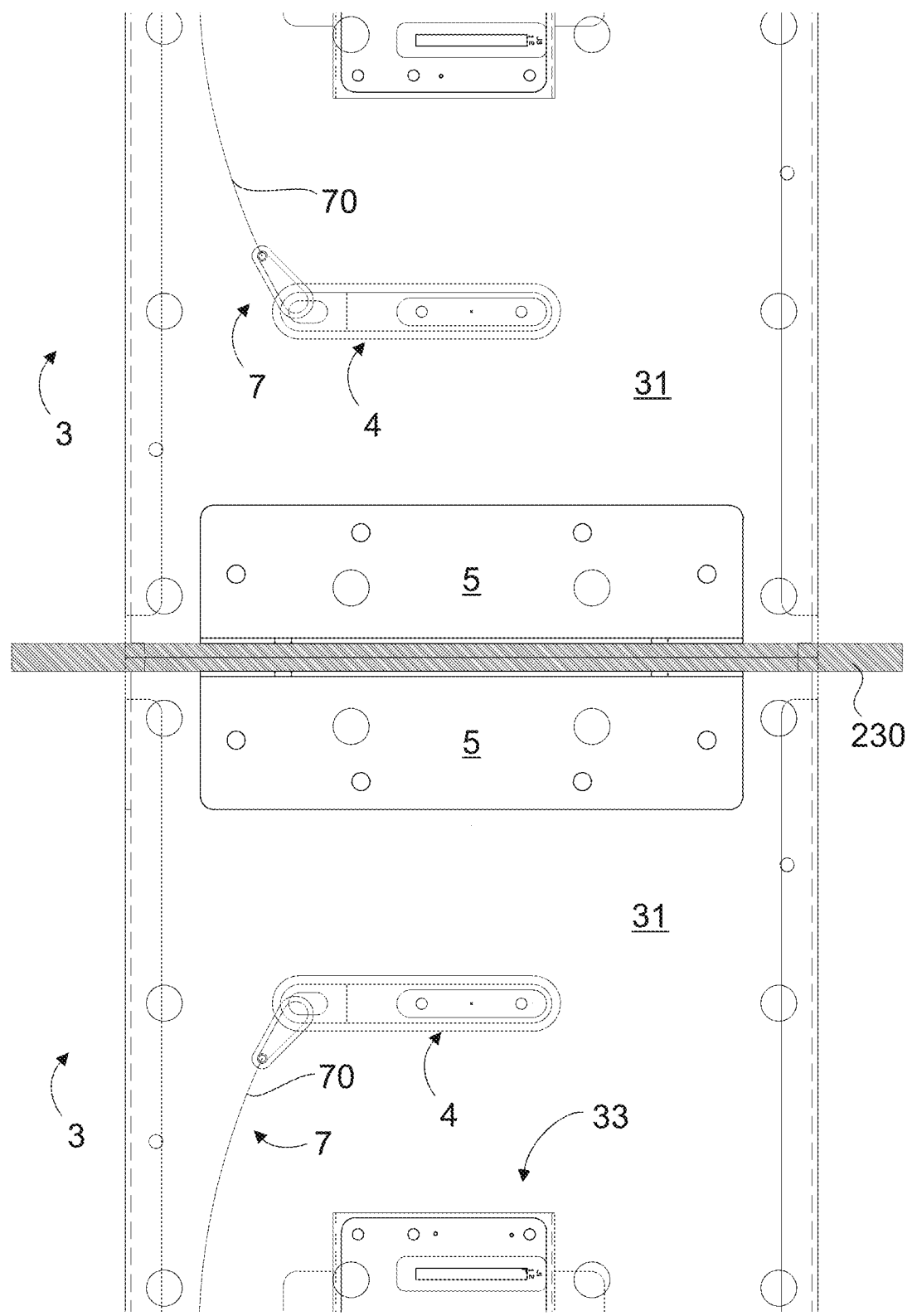
FIG. 5 is a view from above of the assembly portion of two secondary structures at an arc of a multimedia device according to the invention comprising safety means.
Figure 6:
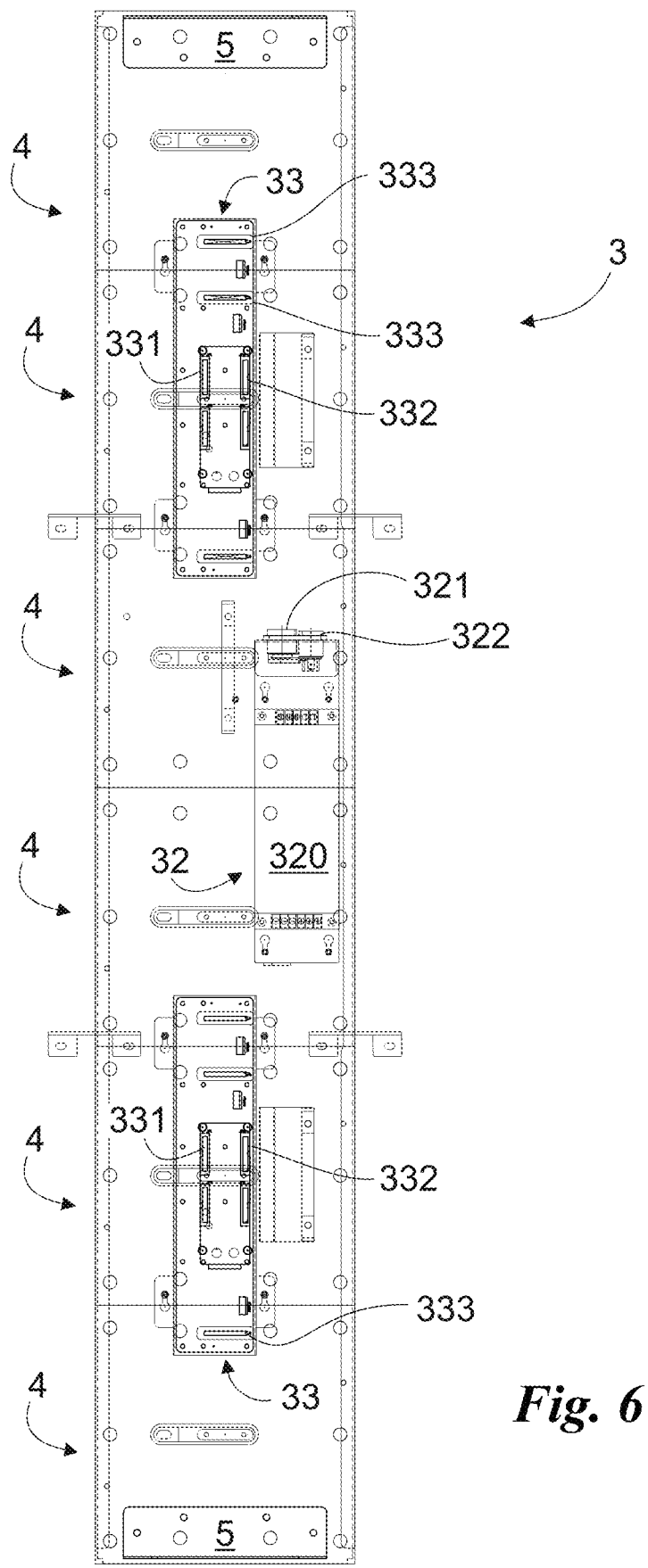
FIG. 6 is a view from above of an example of a secondary structure in which the power supply means and connecting means of a multimedia device according to the invention are shown.

The support 31 may thus comprise rims suitable to be inserted into said notches in order to fasten the secondary structures 3 at least detachably or in a fixed manner. The guideways 232 may thus be counter-shaped with respect to the rims on the support 31. If, for example, the support 31 defines L-shaped rims, as illustrated in FIG. 4, the guideways 232 may also have the same shape.

Preferably, if the secondary structures 3 are flat, the guideways 232 are arranged at the ends of each segment defined by the broken profile 22.

Therefore, the guideways 232 are suitable to enable the installation of the secondary structures 3 on the main structure 2 by means of a controlled interlocking. The device 1 further comprises a plurality of modules 4.

The modules 4 preferably comprise a screen 40 each suitable for projecting images. The screen 40 may comprise any kind of material suitable to allow images to be displayed, preferably digital images. Preferably, each screen 40 comprises a plurality of pixels 400.

As is known, pixels 400 are the smallest units on the screen 40 and suitable to produce a plurality of monochromatic colours.

Each pixel 400 is appropriately spaced on the screen 40, as is known, in order to exploit the surface area of the screen 40 in the best possible way.

Appropriately, the guideways 232 are suitable to enable the structures 3 to be installed so that the reciprocal distance between adjacent secondary structures 3 along the curved profile 21 is less than or equal to the distance between adjacent pixels 400.

Preferably, the reciprocal distance between adjacent secondary structures 3 along the curved profile 21 is equal to the distance between adjacent pixels 400. Moreover, each secondary structure 3 comprises a support 31.

The support 31 is preferably a frame formed as a single piece which may consist of a grid, or a sheet or a plate or any element that enables one or more objects to be supported.

In particular, preferably, each support 31 of each secondary structure 3 is suitable to permanently fasten at least one module 4.

Appropriately, each secondary structure 3 comprises a plurality of modules 4. The latter are arranged on the support 31, preferably arranged adjacent to one another along the main direction 2a.

Thus, preferably, the secondary structures 3 are substantially sheets extending along the main direction 2a, when fastened to the main structure 2, and including each of the modules 4 aligned along the main direction 2a.

Preferably, the distance between each adjacent screen 40 of each module 4 is less than or equal to the distance between two adjacent pixels 400.

More appropriately, the distance between each adjacent screen 40 of each module 4 is equal to the distance between two adjacent pixels 400.

Moreover, preferably, the modules 4 are fastened magnetically to the support 31 in such a way as to be easily removed, but fastened to the secondary structure 3 in a sufficiently permanent manner. Nonetheless, the modules 4 could also be fastened to the support 31 in other ways: for example mechanically or using a combination of mechanical joints and magnetic joints, or in other ways.

Said secondary structures 3, fastened between the arcs 230, when arranged adjacently along the main direction 2a are preferably reciprocally spaced apart by a distance that is less than or equal to the distance between the pixels 400.

Therefore, the screens 40 of the modules 4 together form a large screen that entirely covers the supporting surface 20 and defines an arch in which each break defined by the passage from module 4 to module 4 and from secondary structure 3 to secondary structure 3 is smaller than the distance between the adjacent pixels 400 of each screen 40 so that said break cannot be perceived by a user.

In order to ensure that the device 1 is correctly assembled, main fastening means 5 and secondary fastening means 6 may be used.

The main fastening means 5 are preferably suitable to mechanically fasten each of the secondary structures 3 to at least one arc 230. Therefore, said main fastening means 5 may comprise L-shaped fittings, for example brackets, suitable to fasten the support 31 to the surface of the arc 230 perpendicularly to the main direction 2a. Preferably, the main fastening means 5 are arranged between the guideways 232 along a segment of the broken profile 22.

The secondary fastening means 6 are preferably suitable to mechanically fasten two adjacent secondary structures 3 along the curved profile 21.

Preferably, the secondary fastening means may comprise U-shaped fittings. Such fittings are suitable to connect the secondary structures 3 to one another passing over the rims suitable to interact with the guideways 232. Indeed, preferably, said rims are substantially tabs that protrude from the support 31 and are perpendicular to the surface defined by said support 31.

In addition the device 1 could comprise safety means 7.

The safety means 7 are preferably suitable to prevent at least the modules 4 from falling off the secondary structure 3.

In particular, they comprise at least a cable 70. The cable 70 preferably joins at least two adjacent modules 4 so as to envelop at least part of the support 31. Were a module 4 to become disconnected, it would still be attached as it would be hooked by the cable 70.

If, instead, the cable 70 is arranged in such a way as to also trap a separator element 231 between it and the support 31, the safety means 70 are also suitable to prevent the secondary structures 3 from falling off the main structure 2. Alternatively, preferably, there may be two separate cables 70, one suitable to prevent the modules 4 from falling off the secondary structure 3 and the other to prevent the secondary structure 3 from falling off the main structure 2.

Advantageously, some measures are taken to ensure the correct supply of power to the secondary structures 3.

Preferably, each secondary structure 3 comprises power supply means 32 and connecting means 33.

The power supply means 32 are preferably operationally connected to the connecting means 33. The connecting means 33 are preferably operationally connected to a plurality of modules 4 and suitable to transmit data to the modules 4 in order to produce the images.

Therefore, the power supply means 32 are also preferably suitable to deliver electric power to the modules 4.

In particular, the power supply means 32 comprise at least a transformer 320, a first connector 321 and a second connector 322.

The connectors 321, 322 are electric connectors of the type known in the prior art. Each one is suitable to operationally connect the transformer 320 to another transformer 320 of two respective adjacent secondary structures 3. Furthermore, each transformer 320 is an electric transformer 320 of the type known in the prior art.

Therefore, thanks to this system, all the transformers 320 of the secondary structures 3 can be connected in series and for the entire device 1.

Furthermore, each transformer 320 comprises a plurality of other secondary connectors suitable to enable the distribution of part of the electric energy collected through the first connector 321 or the second connector 322, to the users.

Preferably, the secondary connectors connect each transformer 320 to the connecting means 33 included in the same secondary structure 3.

Each connecting means 33 comprises at least an electronic board 330, a third connector 331 and a fourth connector 332.

Substantially, the connecting means 33 are similar to the power supply means 32, but their purpose is to distribute data in electronic format.

Each connector 331, 332 is suitable to operationally connect the electronic board 330 to at least another electronic board 330. The two electronic boards 330 can thus be included in the same secondary structure 3, or they can be included in two separate and, appropriately, adjacent, secondary structures 3.

In this way, the electronic boards 330 can also be connected in series along the entire length of the device 1.

In addition, each electronic board 330 comprises at least a fifth connector 333. Appropriately, each electronic board 330 comprises a plurality of connectors 333. Each connector 333 is thus suitable to operationally connect the electronic board 330 to one of the modules 4. All the connectors 331, 332, 333 are connectors of a type known in the prior art, for example RJ45 connectors.

In conclusion, each board 330 preferably further comprises a plurality of secondary connectors suitable to operationally connect the electronic board 330 to the transformer 320.

Substantially, the secondary connectors of the transformer 320 are, at least in part, connected to the secondary connectors of each electronic board 330 included in the same secondary structure 3.

The functioning of the multimedia device 1 described above in a structural sense, is as follows.

The main structure 2 can be installed in an area where a curved screen needs to be implemented, for example an arch suitable for projecting digital images.

Because the main structure 2 is a load-bearing structure, the operators are able to move about on top of it to install the secondary structures 3.

Each secondary structure 3 can be prepared in advance by connecting the power supply means to the connecting means 33. Moreover, the modules 4 can be installed and connected to the connecting means 33.

If necessary, the safety means 7 can also be installed immediately.

Once the secondary structures 3 have been prepared, these can be placed between the arcs 230 and positioned by means of the guideways 232.

Lastly, the secondary structures 3 can be permanently locked in place by means of the fastening means 5, 6.

The multimedia device 1 according to the invention achieves some important advantages.

With the multimedia device 1, curved screens, for example arch-shaped screens, can be implemented easily and extremely efficiently, so as to comply with the most unique geometries.

Furthermore, the multimedia device 1 considerably facilitates the work of the operators assembling the structure, by avoiding the use of supporting scaffolding or other similar devices. This advantage is further enhanced by the fact that the modules 4 are magnetic and easy to disassemble.

In conclusion, the device 1 permits the implementation of curved screens with no imperfections thanks to the presence of the guideways 232 and of the joining elements 231, which make it possible to form a pre-determined grid on which the secondary structures 3 can then be positioned.

The invention is subject to variations without departing from the scope of the inventive concept as defined in the claims.

For example, the secondary structures could also be curved and not perfectly flat. In that case, the curved profile 21 would be covered without the need to produce the broken profile 22.

In this context, all details are replaceable by equivalent elements, and the materials, shapes and dimensions may be any materials, shapes and dimensions.

The invention claimed is:

1. A multimedia device comprising:
a main structure defining a supporting surface extending along a main direction and curved along a single direction that is oblique with respect to said main direction so as to form a curved profile,
a plurality of secondary structures configured to be fastened to said main structure in a reciprocally continuous manner along said main direction and said curved profile in such a way as to entirely cover said supporting surface, and
a plurality of modules comprising a screen each configured to project images,
each of said secondary structures comprising a support formed as a single piece and a plurality of said modules arranged adjacent to one another along said main direction on said support,
said supporting surface comprising a plurality of arcs defining said curved profile and being at least oblique with respect to said main direction,
said device further comprising
main fastening means configured to mechanically fasten each of said secondary structures to at least one of said arcs,
each of said supports being substantially a sheet extending along the main direction, when fastened to the main structure, and comprising each of the modules aligned along the main direction,
the fastening means are configured to fasten the support to the surface of the arc.

2. The device according to claim 1, wherein each of said secondary structures comprises power supply means and connecting means, said connecting means being operationally connected to a plurality of said modules and configured to transmit data to said modules to create said images and said power supply means being operationally connected to said connecting means and configured to supply electric power to said connecting means and said modules.

3. The device according to claim 1, wherein each of said power supply means comprises at least a transformer, a first connector and a second connector, said connectors each configured to operationally connect said transformer to another said transformer of two other of said separate secondary structures.

4. The device according to claim 1, wherein each of said connecting means comprises at least one electronic board, a third connector and a fourth connector, said connectors each configured to operationally connect said electronic board to at least another of said electronic boards and each of said electronic boards comprises a plurality of fifth connectors each configured to operationally connect said electronic board to one of said modules.

5. The device according to claim 1, wherein said main structure defines a frame that envelops said supporting surface comprising a plurality of arcs and a plurality of joining elements, each of said arcs defining said curved profile and being at least oblique with respect to said main direction, each of said joining elements defining a rod structure parallel to said main direction and configured to connect said adjacent arcs to one another in such a way that said main structure is a load-bearing structure for a user.

6. The device according to claim 1, wherein the distance between said adjacent arcs is less than the maximum length along said main direction of said secondary structure and said secondary structures are fastened between two of said arcs.

7. The device according to claim 1, wherein said secondary structures are flat and fastened to said main structure in a reciprocally continuous manner along said curved profile so as to entirely cover said supporting surface and form a broken profile approximating to said curved profile and each of said arcs comprises guideways arranged at the ends of each segment defined by said broken profile, said guideways being configured to permit said secondary structures to be installed on said main structure by means of a controlled interlocking.

8. The device according to claim 1, wherein each of said screens comprises a plurality of adjacent reciprocally spaced pixels and said guideways being suitable to allow said secondary structures to be installed in such a way that the reciprocal distance between said adjacent secondary structures along said curved profile is less than or equal to said distance between said adjacent pixels.

9. The device according to claim 1, comprising main fastening means and secondary fastening means, said main fastening means being suitable to mechanically fasten each of said secondary structures to at least one of said arcs and said secondary fastening means being configured to mechanically fasten two of said adjacent secondary structures along said curved profile.

10. The device according to claim 1, comprising safety means configured to prevent at least said modules from falling off said secondary structure and comprising at least a cable, wherein each of said modules is magnetically fastened to said support and said cable connects two of said adjacent modules so as to envelop at least part of said support.

* * * * *